United States Patent
Zhang et al.

(10) Patent No.: US 10,909,022 B2
(45) Date of Patent: Feb. 2, 2021

(54) SYSTEMS AND METHODS FOR IDENTIFYING AND TRACKING APPLICATION PERFORMANCE INCIDENTS

(71) Applicant: Facebook, Inc., Menlo Park, CA (US)

(72) Inventors: Hangjin Zhang, Redmond, WA (US); Donghang Guo, Redmond, WA (US); Jeffrey Scott Dunn, Seattle, WA (US); Jonathan Michael Wiepert, Greenlawn, NY (US); Luke Reynold Styles, Brooklyn, NY (US)

(73) Assignee: Facebook, Inc., Menlo Park, CA (US)

( * ) Notice: Subject to any disclaimer, the term of this patent is extended or adjusted under 35 U.S.C. 154(b) by 0 days.

(21) Appl. No.: 15/702,375

(22) Filed: Sep. 12, 2017

(65) Prior Publication Data

US 2019/0079850 A1 Mar. 14, 2019

(51) Int. Cl.
| | |
|---|---|
| *G06F 8/34* | (2018.01) |
| *G06F 8/65* | (2018.01) |
| *G06F 8/71* | (2018.01) |
| *G06F 11/36* | (2006.01) |

(52) U.S. Cl.
CPC ............ *G06F 11/3636* (2013.01); *G06F 8/34* (2013.01); *G06F 8/71* (2013.01); *G06F 11/3616* (2013.01); *G06F 8/65* (2013.01)

(58) Field of Classification Search
CPC ....... G06F 11/30–3696; G06F 8/10–78; G06F 11/3065; G06F 11/327; G06F 11/3409; G06F 11/3636; G06F 8/34; G06F 8/71; G06F 8/65; G06F 11/3616; H04L 41/142; H04L 47/11; H04L 41/0631; H04L 43/08; H04L 43/16; H04L 43/0823
See application file for complete search history.

(56) References Cited

U.S. PATENT DOCUMENTS

| | | | |
|---|---|---|---|
| 6,745,150 B1 | 6/2004 | Breiman | |
| 7,124,055 B2 * | 10/2006 | Breiman | G06F 17/18 702/181 |
| 9,225,621 B2 * | 12/2015 | Tseitlin | H04L 43/08 |

(Continued)

OTHER PUBLICATIONS

Dunn; Introducing FBLearner Flow: Facebook's AI backbone; https://code.facebook.com/posts/1072626246134461/introducing-fblearner-flow-facebook-s-ai-backbone/; May 9, 2016.

(Continued)

*Primary Examiner* — S. Sough
*Assistant Examiner* — Cheneca Smith
(74) *Attorney, Agent, or Firm* — FisherBroyles, LLP

(57) ABSTRACT

A computer-implemented method for identifying and tracking application performance incidents may include (1) receiving, by an incident tracking system, data representative of a time series, the time series including a time-ordered plurality of values of a performance metric associated with a program, (2) identifying, by the incident tracking system, a discontinuity in the time series, (3) associating, by the incident tracking system, the identified discontinuity in the time series with a change in source code associated with the program, and (4) executing, by the incident tracking system, an automated action based on the association of the identified discontinuity with the change in the source code. Various other methods, systems, and computer-readable media are also disclosed.

20 Claims, 8 Drawing Sheets

(56) References Cited

U.S. PATENT DOCUMENTS

| | | | | |
|---|---|---|---|---|
| 2004/0220771 | A1* | 11/2004 | Breiman | G06F 17/18 |
| | | | | 702/181 |
| 2012/0197686 | A1* | 8/2012 | Abu El Ata | G06Q 10/06 |
| | | | | 705/7.39 |
| 2014/0379901 | A1* | 12/2014 | Tseitlin | H04L 43/08 |
| | | | | 709/224 |
| 2016/0350203 | A1* | 12/2016 | Doganata | G06F 8/70 |
| 2017/0154086 | A1* | 6/2017 | Meier-Magruder | |
| | | | | G06F 11/3068 |
| 2018/0039555 | A1* | 2/2018 | Salunke | G06F 11/3409 |

OTHER PUBLICATIONS

Abraham; Scuba: Diving into Data at Facebook; https://research.fb.com/wp-content/uploads/2016/11/scuba-diving-into-data-at-facebook.pdf; as accessed on Jul. 25, 2017 (dated Aug. 26-30, 2013).

Taylor, Wayne A.; Change-Point Analysis: A Powerful New Tool for Detecting Changes; http://www.variation.com/cpa/tech/changepoint.html (dated 2000).

Wikipedia; Bisection (software engineering); https://en.wikipedia.org/wiki/Bisection_(software_engineering); as accessed on Aug. 22, 2017.

Wikipedia; Change detection; https://en.wikipedia.org/wiki/Change_detection; as accessed on Aug. 21, 2017.

Wikipedia; Pattern recognition; https://en.wikipedia.org/wiki/Pattern_recognition; as accessed on Aug. 21, 2017; as accessed on Aug. 21, 2107.

Wikipedia; Software performance testing; https://en.wikipedia.org/wiki/Software_performance_testing; as accessed on Aug. 21, 2017.

Wikipedia; Step detection; https://en.wikipedia.org/wiki/Step_detection; as accessed Aug. 21, 2017.

* cited by examiner

800

```
802
{
    "task": {
804-1       "Author_ID": "dadams@example.com",
804-2       "subject": "Please review a recent commit for a
                possible regression.",
            "description": "The incident tracking system has
                associated the commit referenced below with an
                application performance incident. Please determine
                whether the commit is responsible for this
                incident. Thank you.
804-3
                Incident: An increase of 300 milliseconds in
                average start-up time.

commit 4b5c6e6f817ec66f44342007202690a93763949
                Date / time: Mon Jul 31 18:20:00 2017"
    }
}
```

FIG. 8

SYSTEMS AND METHODS FOR IDENTIFYING AND TRACKING APPLICATION PERFORMANCE INCIDENTS

BACKGROUND

When application developers introduce changes into applications (e.g., source code changes associated with applications), such changes often have unexpected consequences. For example, application changes may cause errors or reductions in application performance. Testing applications after changes have been made may be useful for determining whether the changes resolve previously detected errors (i.e., "bugs"), whether the changes have introduced new errors, whether the changes have caused reductions in various performance metrics associated with the applications, and so forth. Such testing is commonly referred to as "regression testing."

Unfortunately, traditional regression testing techniques may be inadequate for exposing certain types of errors. For example, some errors may cause only very small reductions in application performance. Traditional regression testing schemes may not effectively discover such very small reductions in application performance, even though these very small errors may result in large costs to developers and/or service providers. And even when such small errors are discovered, it may be difficult for developers to identify a particular change that introduced a particular error.

Additionally, especially with very large code bases and/or large development teams, it may be difficult for a manager and/or supervisor to identify a particular developer who may be responsible for introducing an error or a performance drop into an application's code base. It may, therefore, be difficult for managers and/or supervisors to effectively manage remediation efforts when these "regressions" are discovered.

What is needed, therefore, is a more efficient and/or effective way to identify and track application performance incidents.

SUMMARY

As will be described in greater detail below, the instant disclosure describes various systems and methods for identifying and tracking application performance incidents by identifying discontinuities in a time series of performance metrics of an application (e.g., a program), associating the identified discontinuities with changes in source code associated with the application, and executing automated actions (e.g., remediation actions, data aggregation actions, etc.) based on the association of the identified discontinuity with the change in the source code.

In one example, a computer-implemented method for identifying and resolving application performance variations may include receiving, by an incident tracking system, data representative of a time series. The time series may include a time-ordered plurality of values of a performance metric associated with a program. The method may further include (1) identifying, by the incident tracking system, a discontinuity in the time series, (2) associating, by the incident tracking system, the identified discontinuity in the time series with a change in source code associated with the program, and (3) executing, by the incident tracking system, an automated action based on the association of the identified discontinuity with the change in the source code.

In some embodiments, the time series may include (1) an initial set of values in the time-ordered plurality of values, and (2) a subsequent set of values in the time-ordered plurality of values that immediately temporally follows the initial set of values. In such embodiments, the identification of the discontinuity in the time series may include (1) determining an initial value representative of the initial set of values and a subsequent value representative of the subsequent set of values, (2) comparing the initial value with the subsequent value, and (3) determining that the initial value is different from the subsequent value by at least a predetermined threshold amount based on the comparison of the initial value with the subsequent value.

In at least one embodiment, determining the initial value may include determining an average of the initial set of values, and determining the subsequent value may include determining an average of the subsequent set of values. In other examples, determining the initial value may include determining a linear approximation of the initial set of values, and determining the subsequent value may include determining a linear approximation of the subsequent set of values.

In some embodiments, identifying the discontinuity in the time series may include identifying a time associated with the discontinuity. In such embodiments, associating the identified discontinuity with the change in the source code may include (1) identifying a particular change in the source code having a commit time that is within a predetermined time period preceding the identified time associated with the identified discontinuity, and (2) associating the identified discontinuity with the identified particular change in the source code. In further embodiments, identifying the particular change in the source code may include using a code bisection algorithm, the initial value, and the subsequent value to identify the change in the source code.

In some embodiments, the method may further include receiving, by the incident tracking system, data representative of an additional time series. The additional time series may include another time-ordered plurality of values of another performance metric associated with a program. In such embodiments, the method may further include (1) identifying, by the incident tracking system, discontinuity in the additional time series, and (2) further associating, by the incident tracking system, the identified discontinuity in the additional time series with the change in the source code.

In some embodiments, the method may further include identifying, by the incident tracking system, a user associated with the change in the source code. In such embodiments, executing the automated action based on the association of the identified discontinuity with the change in the source code may include generating a task request that directs the identified user to determine whether the change in the source code introduced a regression into the program. The method may further include receiving, by the incident tracking system, user input indicating a user determination of whether the change in the source code introduced the regression into the program.

In some examples, the method may further include receiving, by the incident tracking system, data representative of a previous user determination of whether a previously identified discontinuity in a previous time series indicated that a previous change in the source code introduced a previous regression into the program. In such examples, the identification of the discontinuity may be further based on the received data representative of the previous user determination.

In some embodiments, the method may further include normalizing, by the incident tracking system, the received data representative of the time series prior to identifying the discontinuity in the time series. In at least one embodiment, the method may further include presenting, by the incident tracking system, a graphical user interface that includes a visual representation of the time series to a user. In such embodiments, identifying the discontinuity in the time series may include receiving input from the user indicating a temporal location of the discontinuity in the time series.

In addition, a corresponding system for identifying and tracking application performance incidents may include several modules stored in memory, including a receiving module that receives data representative of a time series. The time series may include a time-ordered plurality of values of a performance metric associated with a program. The system may further include (1) an identifying module that identifies a discontinuity in the time series, (2) an associating module that associates the identified discontinuity in the time series with a change in source code associated with the program, (3) an executing module that executes an automated action based on the association of the identified discontinuity with the change in the source code, and (4) at least one physical processor that executes the receiving module, the identifying module, the associating module, and the executing module.

In some embodiments, the system may further include a user interface module that (1) receives user input indicating a user determination of whether the change in the source code introduced the regression into the program. In such embodiments, the at least one physical processor further executes the user interface module.

In some examples, the above-described method may be encoded as computer-readable instructions on a non-transitory computer-readable medium. For example, a non-transitory computer-readable medium may include one or more computer-executable instructions that, when executed by at least one processor of a computing device, may cause the computing device to receive data representative of a time series. The time series may include a time-ordered plurality of values of a performance metric associated with a program. The non-transitory computer-readable medium may further include one or more computer-executable instructions that, when executed by at least one processor of a computing device, may cause the computing device to (1) identify a discontinuity in the time series, (2) associate the identified discontinuity in the time series with a change in source code associated with the program, and (3) execute an automated action based on the association of the identified discontinuity with the change in the source code.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

FIG. 8 illustrates identifying and tracking application performance incidents by executing an automated action based on an association of an identified discontinuity with a change in source code in accordance with some exemplary embodiments.

Figure 1:
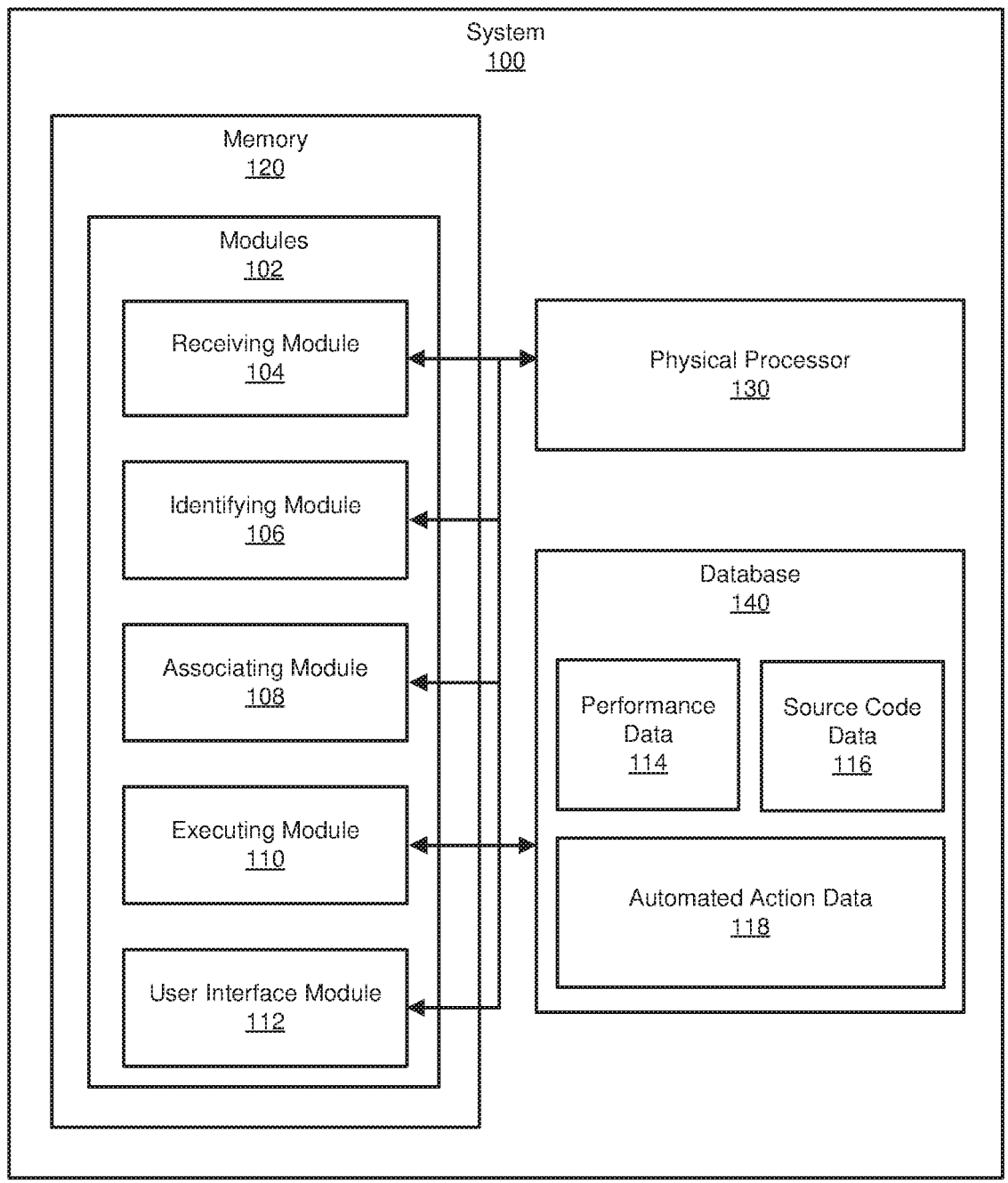
FIG. 1 is a block diagram of an exemplary system for identifying and tracking application performance incidents.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

The present disclosure is generally directed to systems and methods for identifying and tracking application performance incidents. The term "application performance incident" may generally refer to any change in a performance metric associated with an application (e.g., a program) that exceeds a predetermined threshold. As will be explained in greater detail below, the systems and methods described herein may receive data representative of a time series. The time series may include a time-ordered plurality of values of a performance metric associated with a program. The systems and methods may then identify a discontinuity in the time series, associate the identified discontinuity in the time series with a change in source code associated with the program, and execute an automated action based on the association of the identified discontinuity with the change in the source code. In this and other ways, the systems and methods described herein may identify and track application performance incidents.

The systems and methods described herein may provide various benefits and useful features. For example, identification of discontinuities in a time series of performance metrics (e.g., results of continuously run performance tests) associated with a program may serve to identify even very small application performance incidents. Additionally, association of identified discontinuities in performance with specific source code changes may help to identify specific source code changes that may have caused application performance incidents. This association between discontinuities in performance data and source code changes may also serve to identify a specific developer who may have been responsible for introducing the change that caused an application performance incident, and who may also be a suitable developer to determine whether the change actually introduced an error or regression into the program, and/or whether the application performance incident may be attributable to other activity (e.g., high service usage, intentional source code changes, etc.). Furthermore, the systems and methods described herein may provide a useful feedback mechanism that may lead to continuous improvement in the systems' ability to reliably identify and track application performance incidents. Embodiments of the instant disclosure may also provide various other advantages and features, as discussed in greater detail below.

The following will provide, with reference to FIGS. 1, 2, and 4-8, detailed descriptions of exemplary systems for identifying and tracking application performance incidents. Detailed descriptions of corresponding computer-implemented methods will also be provided in connection with FIG. 3.

FIG. 1 is a block diagram of an exemplary incident tracking system ("system 100") for identifying and tracking application performance incidents. As illustrated in this figure, exemplary system 100 may include one or more modules 102 for performing one or more tasks. As will be explained in greater detail below, modules 102 may include a receiving module 104 that receives data representative of a time series. The time series may include a time-ordered plurality of values of a performance metric associated with a program. Additionally, exemplary system 100 may include an identifying module 106 that identifies a discontinuity in the time series. Exemplary system 100 may also include an associating module 108 that associates the identified discontinuity in the time series with a change in source code associated with the program, and an executing module 110 that executes an automated action based on the association of the identified discontinuity with the change in the source code. In some implementations, exemplary system 100 may further include user interface module 112 that (1) presents a graphical user interface comprising a visual representation of the time series to a user, and (2) receives user input indicating a user determination of whether the change in the source code introduced the regression into the program.

As illustrated in FIG. 1, exemplary system 100 may also include one or more memory devices, such as memory 120. Memory 120 generally represents any type or form of volatile or non-volatile storage device or medium capable of storing data and/or computer-readable instructions. In one example, memory 120 may store, load, and/or maintain one or more of modules 102. Examples of memory 120 include, without limitation, Random Access Memory (RAM), Read Only Memory (ROM), flash memory, Hard Disk Drives, (HDDs), Solid-State Drives (SSDs), optical disk drives, caches, variations or combinations of one or more of the same, or any other suitable storage memory.

As further illustrated in FIG. 1, exemplary system 100 may also include one or more physical processors, such as physical processor 130. Physical processor 130 generally represents any type or form of hardware-implemented processing unit capable of interpreting and/or executing computer-readable instructions. In one example, physical processor 130 may access and/or modify one or more of modules 102 stored in memory 120. Additionally or alternatively, physical processor 130 may execute one or more of modules 102 to facilitate identifying and tracking application performance incidents. Examples of physical processor 130 include, without limitation, microprocessors, microcontrollers, central processing units (CPUs), Field-Programmable Gate Arrays (FPGAs) that implement softcore processors, Application-Specific Integrated Circuits (ASICs), portions of one or more of the same, variations or combinations of one or more of the same, or any other suitable physical processor.

As also illustrated in FIG. 1, exemplary system 100 may also include one or more databases, such as database 140. In at least one example, database 140 may include performance data 114 for storing information about performance of a program, source code data 116 for storing information about source code associated with the program, and automated action data 118 for storing information about automated actions based on associations of identified discontinuities with changes in the source code.

Database 140 may represent portions of a single database or computing device or a plurality of databases or computing devices. In some embodiments, database 140 may be a logical container for data and may be implemented in various forms (e.g., a database, a file, a data structure, etc.). Examples of database 140 may include databases or database management systems such as SCUBA from FACEBOOK of Menlo Park, Calif., APACHE HIVE, an operational data store (ODS), etc.

Figure 2:
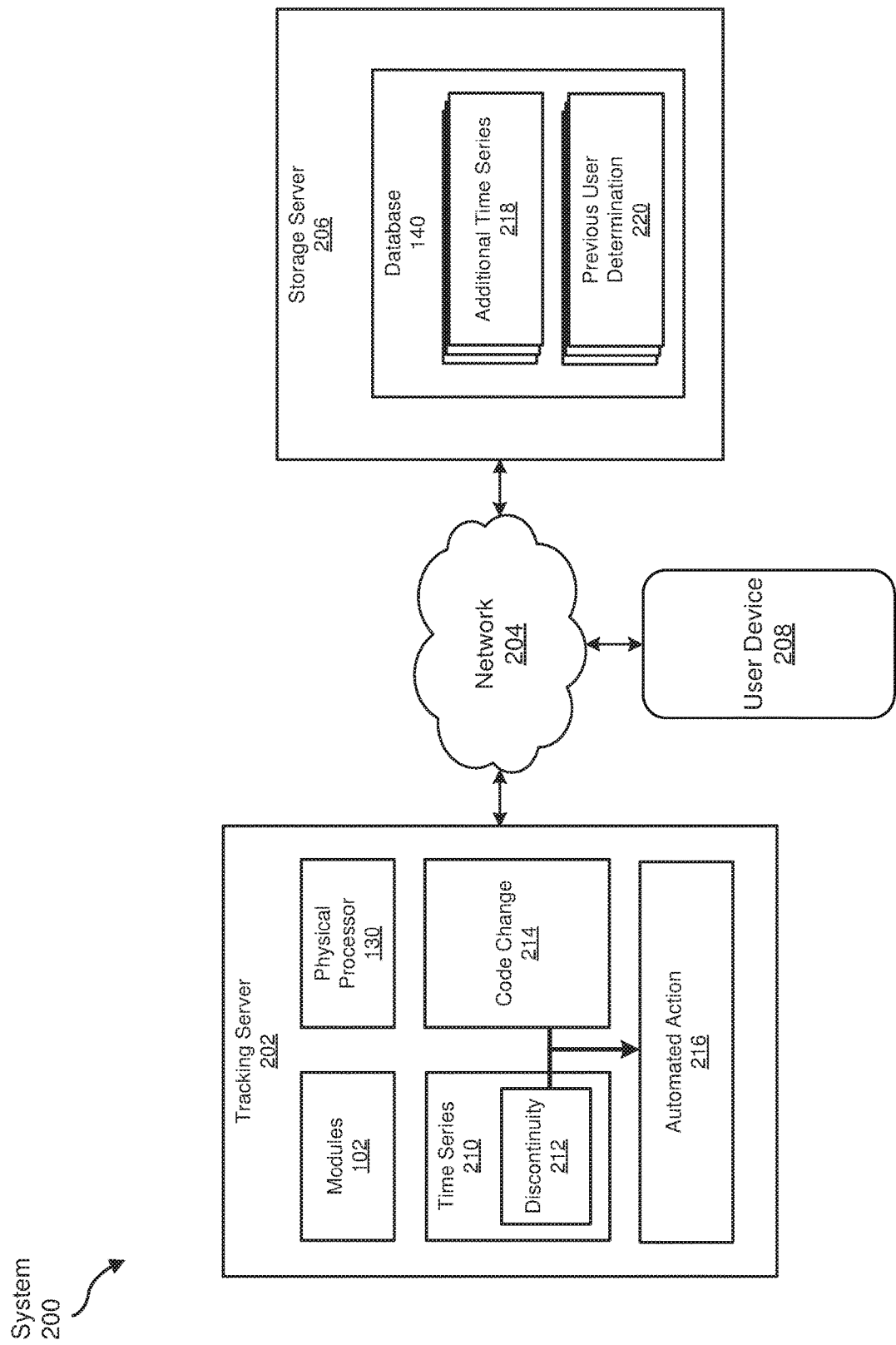
FIG. 2 is a block diagram of an exemplary system for identifying and tracking application performance incidents.

Exemplary system 100 in FIG. 1 may be implemented in a variety of ways. For example, all or a portion of exemplary system 100 may represent portions of exemplary system 200 in FIG. 2. As shown in FIG. 2, system 200 may include a tracking server 202 in communication with a storage server 206 and a user device 208 via network 204. In at least one example, tracking server 202 may be programmed with one or more of modules 102 and/or may store all or a portion of the data in database 140. Additionally or alternatively, storage server 206 and/or user device 208 may be programmed with one or more of modules 102 and/or may store all or a portion of the data in database 140.

In at least one embodiment, one or more modules 102 from FIG. 1 may, when executed by at least one processor of tracking server 202, storage server 206, and/or user device 208, enable tracking server 202, storage server 206, and/or user device 208 to perform one or more operations to identify and track application performance incidents. For example, as will be described in greater detail below, receiving module 104 may cause tracking server 202, storage server 206, and/or user device 208 to receive data representative of a time series (e.g., time series 210) that includes a time-ordered plurality of values of a performance metric associated with a program. Identifying module 106 may cause tracking server 202, storage server 206, and/or user device 208 to identify a discontinuity in the time series (e.g., discontinuity 212). Associating module 108 may cause tracking server 202, storage server 206, and/or user device 208 to associate the identified discontinuity in the time series with a change in source code associated with the program (e.g., code change 214). Executing module 110 may then cause tracking server 202, storage server 206, and/or user device 208 to execute an automated action (e.g., automated action 216) based on the association of the identified discontinuity with the change in the source code.

In at least one embodiment, receiving module 104 may also cause tracking server 202, storage server 206, and/or user device 208 to receive data representative of an additional time series that includes another time-ordered plurality of values of another performance metric associated with the program (e.g., at least one of additional time series 218). In such embodiments, identifying module 106 may also cause tracking server 202, storage server 206, and/or user device 208 to identify a discontinuity in the additional time series, and associating module 108 may further associate the identified discontinuity in the additional time series with the change in the source code.

In additional embodiments, user interface module 112 may cause tracking server 202, storage server 206, and/or user device 208 to receive user input indicating a user determination of whether the change in the source code (i.e., the change associated with the discontinuity) introduced the regression into the program. Additionally or alternatively, user interface module 112 may cause tracking server 202, storage server 206, and/or user device 208 to present a graphical user interface including a visual representation of the time series to a user. One or more modules 102 (e.g., receiving module 104, identifying module 106, et may then receive input from the user indicating the temporal location of the discontinuity in the time series and/or base an identification of the temporal location of the discontinuity on the received user input.

In at least one additional embodiment, one or more modules 102 (e.g., receiving module 104, identifying module 106, etc.) may cause tracking server 202, storage server 206, and/or user device 208 to receive data representative of a previous user determination (e.g., previous user determination 220) of whether a previously identified discontinuity in a previous time series indicated that a previous change in the source code introduced a previous regression into the program. One or more modules 102 (e.g., identifying module 106) may then identify the discontinuity based on the received data representative of the previous user determination.

Tracking server 202 generally represents any type or form of computing device capable of reading computer-executable instructions and/or hosting executables. Examples of tracking server 202 include, without limitation, application servers, storage servers, database servers, web servers, and/or any other suitable computing device configured to run certain software applications and/or provide various testing, web, storage, and/or database services.

In at least one example, tracking server 202 may be a computing device programmed with one or more of modules 102. All or a portion of the functionality of modules 102 may be performed by tracking server 202 and/or any other suitable computing system. As will be described in greater detail below, one or more of modules 102 from FIG. 1 may, when executed by at least one processor of tracking server 202, enable tracking server 202 to identify and track application performance incidents.

Network 204 generally represents any medium or architecture capable of facilitating communication and/or data transfer between tracking server 202, storage server 206, and/or user device 208. Examples of network 204 include, without limitation, an intranet, a WAN, a LAN, a Personal Area Network (PAN), the Internet, Power Line Communications (PLC), a cellular network (e.g., a Global System for Mobile Communications (GSM) network, a code-division multiple access (CDMA) network, a Long-Term Evolution (LTE) network, etc.), universal serial bus (USB) connections, APPLE LIGHTENING connections, and the like. Network 204 may facilitate communication or data transfer using wireless or wired connections. In one embodiment, network 204 may facilitate communication between tracking server 202, storage server 206, and user device 208.

Storage server 206 generally represents any type or form of computing device capable of reading computer-executable instructions and/or hosting executables and communicating with tracking server 202 and/or user device 208 via network 204. In at least one embodiment, storage server 206 may accept one or more directions from tracking server 202. As shown, storage server 206 may host all or part of database 140. Examples of storage server 206 include, without limitation, application servers, storage servers, database servers, web servers, and/or any other suitable computing device configured to run certain software applications and/or provide various testing, web, storage, and/or database services.

User device 208 generally represents any type or form of computing device capable of reading computer-executable instructions, presenting a user interface to a user, and receiving input from the user. In at least one embodiment, user device 208 may accept one or more directions from tracking server 202 and/or storage server 206. Examples of user device 208 include, without limitation, desktop computers, laptops, tablets, cellular phones, (e.g., smartphones), personal digital assistants (PDAs), multimedia players, embedded systems, wearable devices (e.g., smart watches, smart glasses, etc.), gaming consoles, combinations of one or more of the same, or any other suitable mobile computing device.

Many other devices or subsystems may be connected to system 100 in FIG. 1 and/or system 200 in FIG. 2. Conversely, all of the components and devices illustrated in FIGS. 1 and 2 need not be present to practice the embodiments described and/or illustrated herein. The devices and subsystems referenced above may also be interconnected in different ways from those shown in FIG. 2. Systems 100 and 200 may also employ any number of software, firmware, and/or hardware configurations. For example, one or more of the example embodiments disclosed herein may be encoded as a computer program (also referred to as computer software, software applications, computer-readable instructions, and/or computer control logic) on a computer-readable medium.

The term "computer-readable medium," as used herein, generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, floppy disks, and so forth), optical-storage media (e.g., Compact Disks (CDs), Digital Video Disks (DVDs), BLU-RAY disks, and so forth), electronic-storage media (e.g., solid-state drives, FLASH media, and so forth), and other distribution systems.

Figure 3:
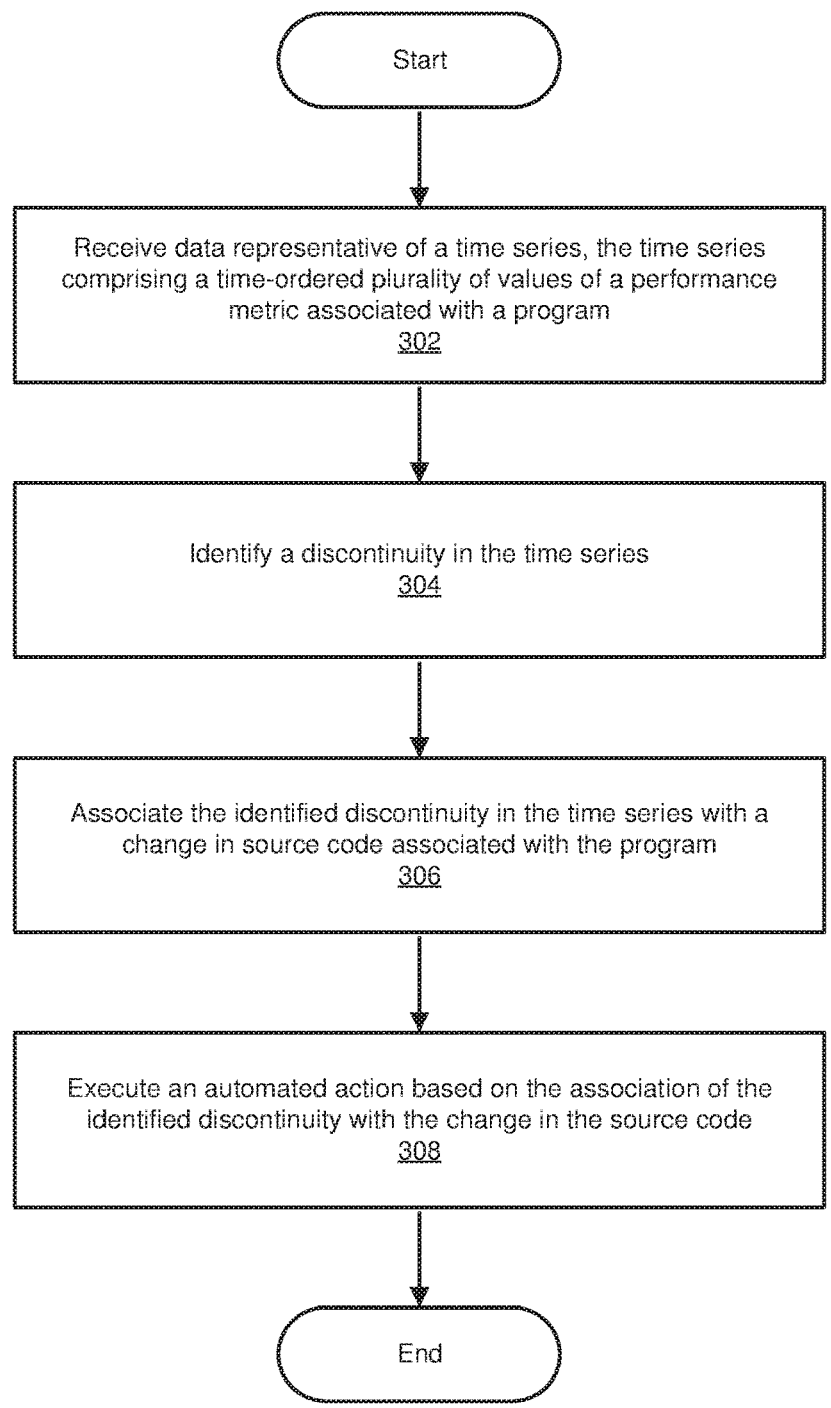
FIG. 3 is a flow diagram of an exemplary method for identifying and tracking application performance incidents.

FIG. 3 is a flow diagram of an example computer-implemented method 300 for identifying and tracking application performance incidents. The steps shown in FIG. 3 may be performed by any suitable computer-executable code and/or computing system, including system 100 in FIG. 1, system 200 in FIG. 2, and/or variations or combinations of one or more of the same. In one example, each of the steps shown in FIG. 3 may represent an algorithm whose structure includes and/or is represented by multiple sub-steps, examples of which will be provided in greater detail below.

As illustrated in FIG. 3, at operation 302, one or more of the systems described herein may receive data representative of a time series that includes a time-ordered plurality of values of a performance metric associated with a program. For example, receiving module 104 may, as part of tracking server 202, receive time series 210.

As used herein, the term "time series" may generally refer to any time-ordered set of values of a performance metric associated with a program as measured over a period of time. For example, a suitable performance data collection system may execute a performance test of a program and store a performance metric that corresponds to the time of the performance test (e.g., "At time $T_0$, the program exhibited a startup time of 40 milliseconds."). A performance data collection system may execute such performance tests repeatedly, resulting a time-ordered set of results of these performance tests (e.g., "At time $T_0$, the program exhibited a startup time of 40 milliseconds; at time $T_1$, the program exhibited a startup time of 42 milliseconds . . . " etc.). The performance data collection system may store the collected performance metrics as a time series within database 140 (e.g., time series 210 within performance data 114) for use by the systems and methods described herein. In some examples, a time series may indicate performance of a program according to a specific performance metric over the time period of the time series.

As used herein, a "performance metric" may be any quantifiable measurement of program performance. Suitable performance metrics may include, but are not limited to, application startup time, graphical user interface frame generation time, rendering (e.g., a page render time, a user interface render time, etc.), scroll performance, instruction counts, memory footprint (e.g., amount of memory taken during a test), CPU usage, network resource usage, network traffic sent and received, average response time, error rate, network request rate, garbage collection metrics, build time (e.g., amount of time a compiler takes to build an executable version of the program), time to load dependencies (e.g., shared objects, libraries, etc.), server response time, thread priority inversions, time spent in lock contention, number of executions (e.g., number of compilation operations), build size (e.g., size of a compiled version of the program), power consumption (e.g., amount of electrical power consumed by a computing device while executing a performance test), battery consumption (e.g., amount of battery resources consumed by a computing device while executing a performance test), and so forth.

Figure 4:
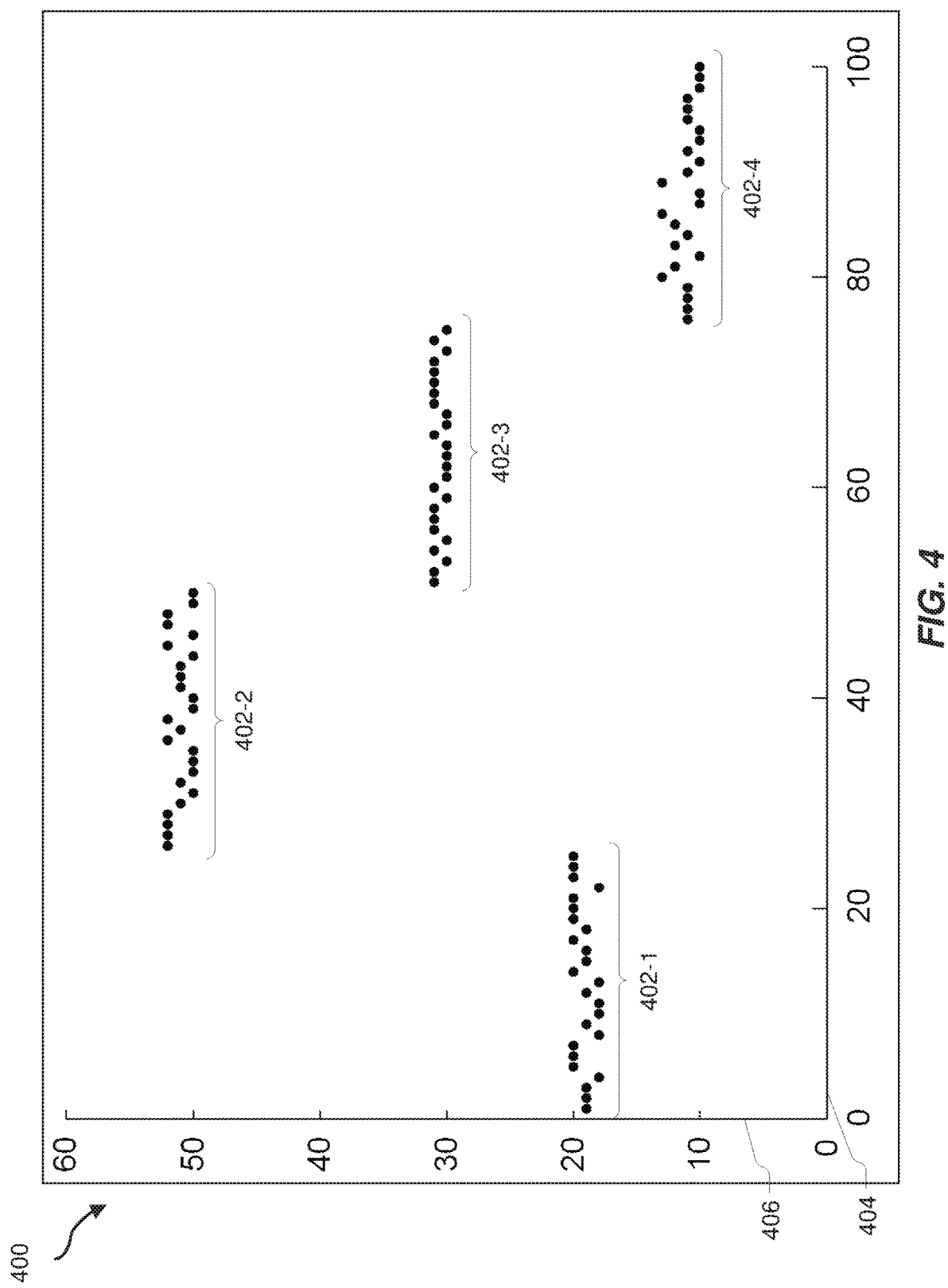
FIGS. 4-6 illustrate identifying and tracking application performance incidents by identifying a discontinuity in a time series in accordance with some exemplary embodiments.

By way of illustration, FIG. 4 shows a chart 400 of an exemplary time series 402. As shown, chart 400 includes a time axis 404 and a performance metric value axis 406. As an example, the performance metric corresponding to time series 402 may be application start time measured in milliseconds (ms). In this example, the points shown on chart 400 may indicate application start time values corresponding to performance tests executed at various times. As shown, time series 402 may include one or more segments 402-N (e.g., 402-1 through 402-4).

Receiving module 104 may receive data representative of the time series in a variety of ways and/or contexts. For example, receiving module 104 may direct storage server 206 to access time series 210 from database 140 and send time series 210 to tracking server 202 by way of network 204. Receiving module 104 may, as part of tracking server 202, then receive time series 210 from storage server 206 via network 204.

Returning to FIG. 3, at operation 304, one or more of the systems described herein may identify a discontinuity in a time series. For example, identifying module 106 may, as part of tracking server 202 in FIG. 2, identify a discontinuity 212 in time series 210. As used herein, the term "discontinuity" generally refers to a temporal location in a time series where a performance value corresponding to that temporal location differs, by at least a threshold amount, from an additional performance value associated with the time series. The additional performance value associated with the time series may include, but is not limited to, a performance value corresponding to another temporal location in the time series (e.g., a following temporal location in the time series, a preceding temporal location in the time series, etc.), an average value of at least a segment of the time series, a predesignated (e.g., anticipated, expected, etc.) performance value of the time series, etc.

As time series 210 may indicate performance of a program (e.g., performance of the program according to a specific performance metric) over time, a discontinuity in time series 210 may indicate a time of a change in performance of the program. Hence, identification of such discontinuities may allow for identification of specific times when the application performance incidents occurred. As will be described in greater detail below, these specific times may be correlated with specific changes to source code associated with the program, allowing for identification of specific code changes that may have caused one or more application performance incidents.

Identifying module 106 may identify a discontinuity in a time series in a variety ways and contexts. For example, identifying module 106 may select a first performance value included in the time series and a second performance value included in the time series, and may calculate a difference between them. When the calculated difference between the first selected performance value and the second selected performance value is greater than a predetermined threshold amount, identifying module 106 may designate the time in the time series corresponding to the first selected performance value, the time in the time series corresponding to the second selected performance value, and/or a time between the time in the time series corresponding to the first selected performance value and the time in the time series corresponding to the second selected performance value as a discontinuity.

As another example, identifying module 106 may calculate an average performance value corresponding to at least a segment of the time series. Identifying module 106 may then identify a performance value in the time series that varies from the calculated average performance value by at least a predetermined threshold amount, and may designate the time in the time series corresponding to the identified performance value as a discontinuity.

As a further example, the time series may include an initial set of values and a subsequent set of values. Identifying module 106 may identify the discontinuity by determining an initial value representative of the initial set of values and a subsequent value representative of the subsequent set of values. Identifying module 106 may then compare the initial value with the subsequent value. Based on the comparison, identifying module 106 may then determine that the initial value is different from the subsequent value by at least a predetermined threshold amount, and may designate a time associated with the initial set of values, a time associated with the subsequent set of values, and/or a time between the initial set of values and the subsequent set of values as a discontinuity.

Identifying module 106 may determine an initial value representative of an initial set of values and a subsequent value representative of a subsequent set of values in any suitable way. For example, identifying module 106 may analyze time series 210 to identify periods of low variance and then divide time series 210 into a number of segments (e.g., contiguous segments) based on that identification. For each segment, identifying module 106 may then determine (e.g., calculate) an average of the performance values included in the segment, and assign the determined average as the value representative of that segment. Additionally or alternatively, identifying module 106 may determine a value corresponding to each segment by determining a linear approximation for each segment via any suitable linear approximation heuristic and/or algorithm. The determined linear approximation for a segment may represent a value corresponding to that segment.

Continuing with the previous example, identifying module 106 may then select two temporally adjacent segments and designate the value corresponding to one as the initial value and the value corresponding to the other as the subsequent value. Identifying module 106 may then compare the initial value and the subsequent value. If the initial value differs from the subsequent value by at least a predetermined threshold amount, identifying module 106 may identify a discontinuity at the time in time series 210 where the two selected temporally adjacent segments meet.

Figure 5:
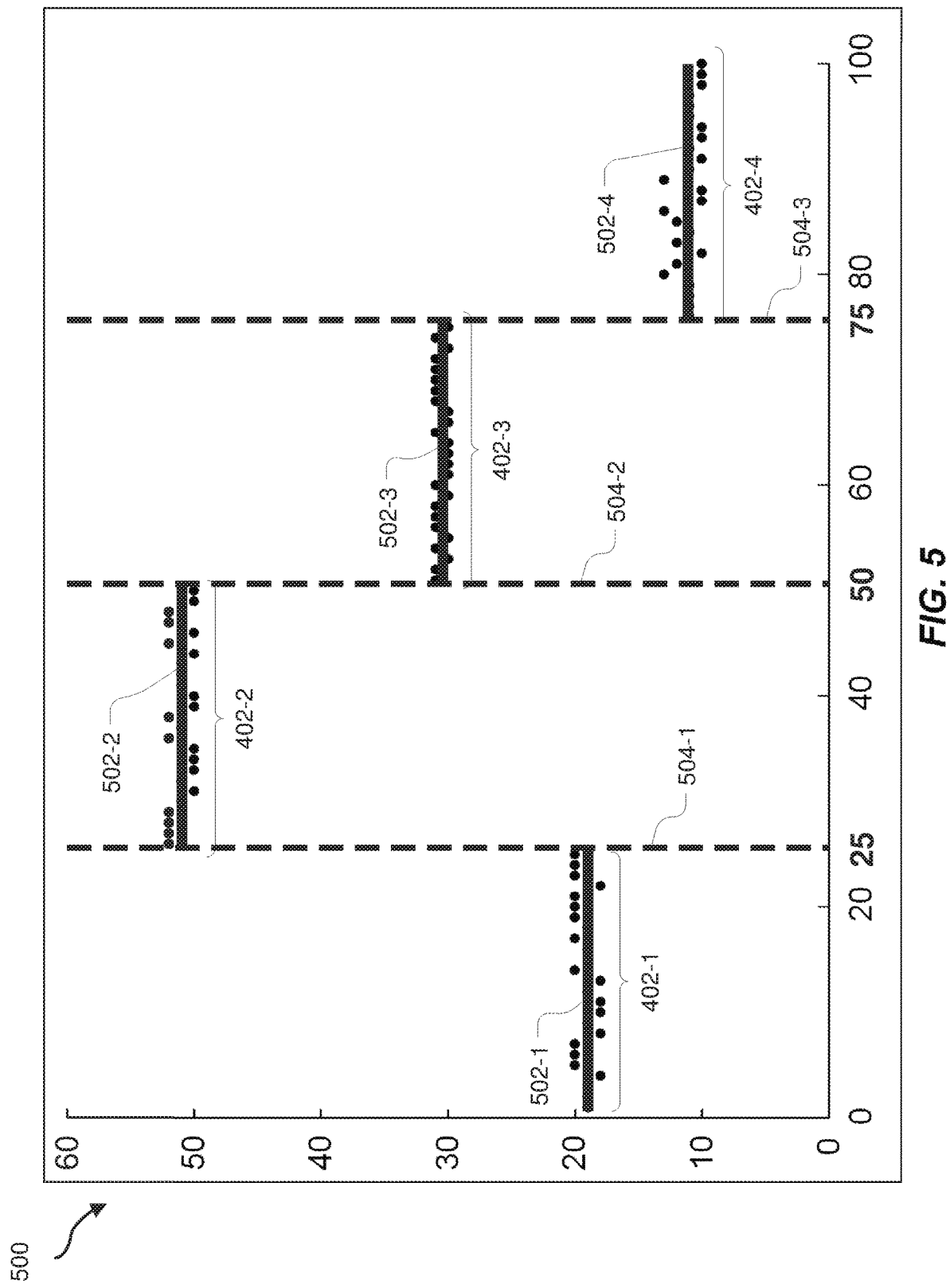

By way of illustration, FIG. 5 shows a chart 500 that shows a visual representation of one or more ways in which the systems and methods described herein may identify a discontinuity in time series 402 of FIG. 4. As described above, identifying module 106 may analyze time series 402 to identify periods of low variance and then divide time series 402 into a number of segments 402-1 through 402-4. For each segment of time series 402, identifying module 106 may then calculate an average of the values included in the segment and assign the determined average as the value representative of that segment. In chart 500, these values are represented by horizontal lines 502-1 through 502-4.

Identifying module 106 may then select two temporally adjacent segments, such as segment 402-1 and segment 402-2, and calculate a difference between the values assigned to the selected segments. For example, as shown in chart 500, identifying module 106 may assign segment 402-1 a value of 19 ms and may assign segment 402-2 a value of 51 ms. Identifying module 106 may select adjacent segments 402-1 and 402-2 and calculate that the difference (e.g., absolute value of the difference) between their respective values is 32 ms. This value may be greater than a predetermined threshold (e.g., 2 ms). Hence, identifying module 106 may identify a discontinuity at a location corresponding to the time in time series 402 when segment 402-1 and segment 402-2 meet.

In chart 500, identified discontinuities may be represented by vertical lines 504-1 through 504-3. Vertical line 504-1 may indicate that identifying module 106 may identify a discontinuity between segments 4024 and 402-2 at t=25, vertical line 504-2 may indicate that identifying module 106 may identify a discontinuity between segments 402-2 and 402-3 at t=50, and vertical line 504-3 may indicate that identifying module 106 may identify a discontinuity between segments 402-3 and 402-4 at t=75.

In at least one embodiment, identifying module 106 may identify a discontinuity in time series 210 by receiving input from a user indicating a temporal location of the discontinuity in time series 210. For example, user interface module 112 may present a graphical user interface (GUI) to a user via user device 208 that includes a visual representation of time series 210. The GUI may also include at least one tool that may allow the user to provide input indicating a temporal location of a discontinuity in time series 210.

Figure 6:
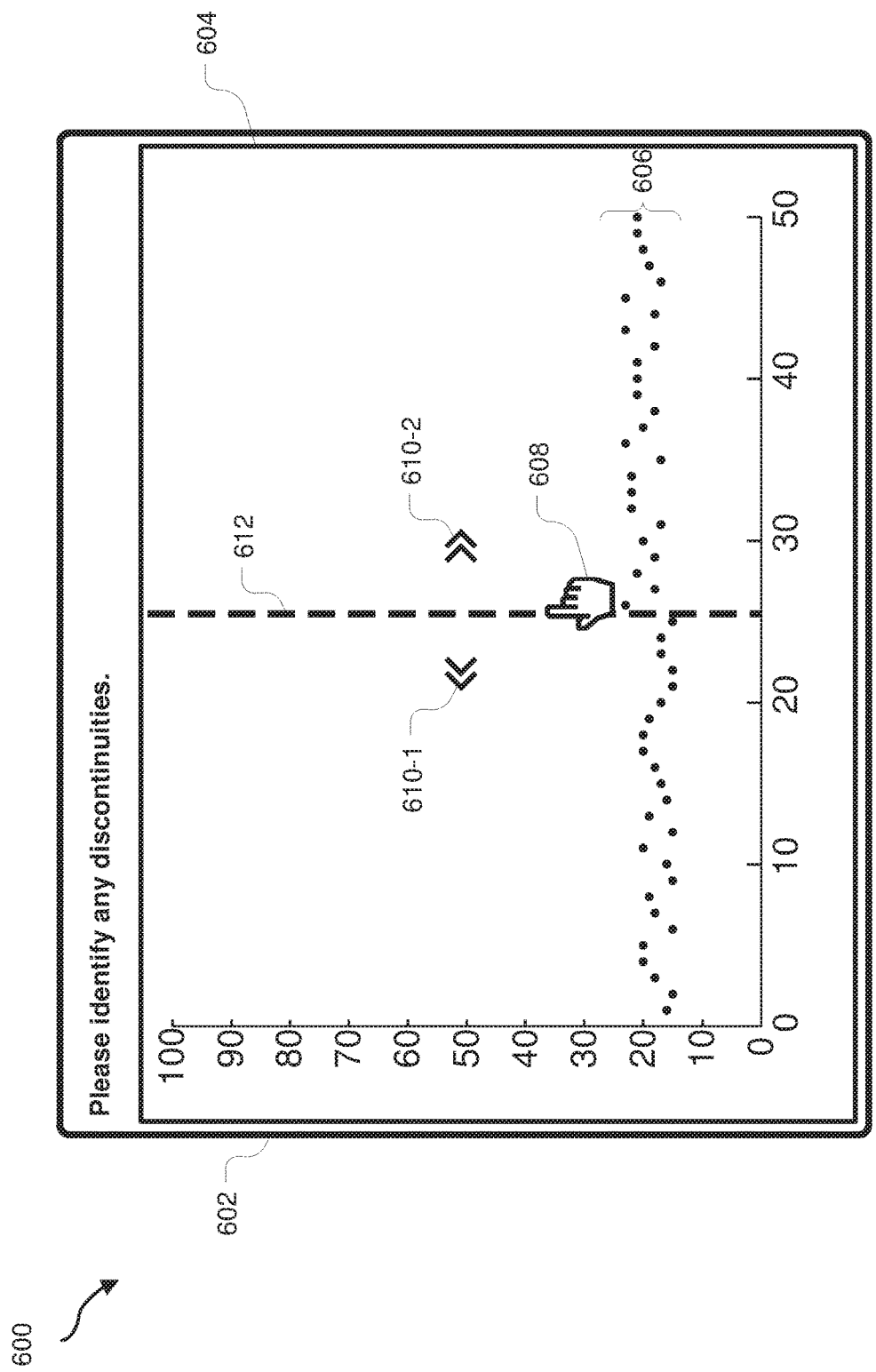

FIG. 6 shows a GUI 600 that user interface module 112 may present to a user via s device 208 and that may allow a user to provide input that indicates a temporal location of a discontinuity in a time series. As shown, GUI 600 includes a window 602 and a chart 604 in window 602. Chart 604 includes a time series 606.

In contrast with other examples of time series shown herein (e.g., e series 402), it may be difficult for identifying module 106 to identify a point of discontinuity in time series 606 using one or more other methods described herein. This may be due to any number of factors including, but not limited to, a high amount of noise in time series 606, a relatively low amount of variance in the values included in time series 606, and so forth.

GUI 600 may also include a selector 608, arrows 610 (e.g., 610-1 and 610-2), and an indicator line 612. A user may utilize arrows 610 and/or selector 608 to position indicator line 612 at any point along time series 606. When the user is satisfied that indicator line 612 is positioned at a point of discontinuity in time series 606, the user may provide input (e.g., by way of selector 608) indicating that the temporal location within time series 606 corresponding to the position of indicator line 612 is a discontinuity. Identifying module 106 may then identify the temporal location selected by the user as a discontinuity in time series 606 based on the received user input.

In some embodiments, identifying module 106 may additionally or alternatively identify a discontinuity in a time series using any suitable step detection or change detection algorithm. For example, identifying module 106 may perform a change-point analysis (e.g., a Bayesian change-point analysis, a cumulative sum control chart analysis, a Shiryaev-Roberts Procedure, etc.) on the data points included in time series 210. The change-point analysis may indicate at least one change (e.g., a specific time, a period of time, etc.) within time series 210. Based on this change-point analysis, identifying module 106 may identify the time of the indicated change as a discontinuity.

Additionally, in at least one embodiment, prior to identifying discontinuities in time series 210, one or more modules 102 (e.g., identifying module 106) may perform one or more preprocessing operations on data included in time series 210. For example, identifying module 106 may normalize and/or standardize the data included in time series 210. Additionally or alternatively, identifying module 106 may apply one or more suitable noise reduction algorithms and/or filters to at least a segment of time series 210. Such preprocessing of time series 210 may result in an improvement to one or more ways that identifying module 106 may identify a discontinuity in time series 210. For example, such preprocessing may reduce an amount of CPU resources that may be required during the identification process and/or may emphasize points of discontinuity in time series 210 when user interface module 112 presents time series 210 to a user by way of user device 208.

In some embodiments, and as will be described in greater detail below in relation to operations 306 and 308 of FIG. 3, identifying module 106 may additionally identify a discontinuity in time series 210 based on data representative of a previous user determination of whether a previously identified discontinuity in a time series indicated that a previous change in source code introduced a previous regression into the program.

Returning to FIG. 3, at operation 306, one or more of the systems described herein may associate an identified discontinuity in a time series with a change in source code associated with a program. For example, associating module 108 may, as part of tracking server 202 in FIG. 2, associate discontinuity 212 in time series 210 with code change 214.

As described above, an identified discontinuity (e.g., discontinuity 212) may indicate and/or correlate with a time that an application performance incident occurred. Identified discontinuities may therefore be correlated with times specific source code changes were introduced. Associating identified discontinuities with specific changes to source code may allow for identification of specific code changes that may have caused specific application performance incidents.

Associating module 108 may associate the identified discontinuity in the time series with a change in source code associated with the program in a variety of contexts. For example, as described above, an identified discontinuity (e.g., discontinuity 212) may be associated with an identified time. In such examples, associating module 108 may associate the identified discontinuity with the change in the source code (e.g., code change 214) by identifying a particular change in the source code (e.g., source code data 116) having a commit time that is within a predetermined time period preceding the identified time associated with the identified discontinuity (e.g., discontinuity 212).

Figure 7:
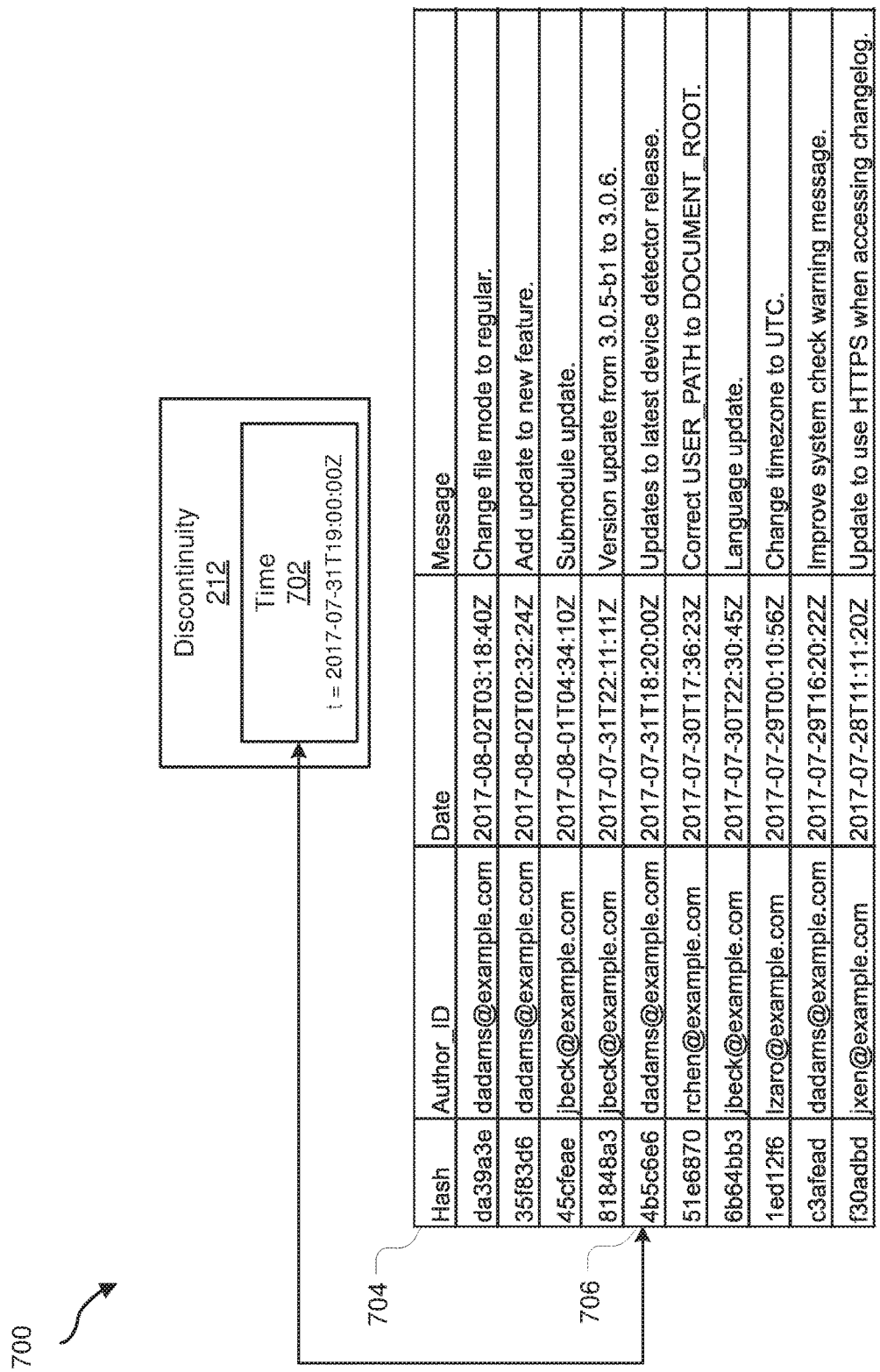
FIG. 7 illustrates identifying and tracking application performance incidents by associating an identified discontinuity in a time series with a change in source code associated with a program in accordance with some exemplary embodiments.

FIG. 7 illustrates an exemplary identification of a change in a version-controlled source code base (e.g., source code data 116) that corresponds to a time associated with an identified discontinuity (e.g., discontinuity 212). As shown, view 700 includes discontinuity 212 with an identified time 702 ("time 702") of "2017-07-31T19:00:00Z," along with a change log 704. Change log 704 may be part of source code data 116, and may include records of committed changes to source code of the program, with each record including a hash value, an author identifier (e.g., Author_ID), a date stamp, and a commit message corresponding to a source code change included in source code data 116.

Associating module 108 may analyze change log 704 and identify a record that includes a date stamp within a predetermined time of time 702. For example, associating module 108 may identify record 706 as having a date stamp within a predetermined time (e.g., one hour, 30 minutes, 10 seconds, etc.) of time 702. Based on the identification of record 706, associating module 108 may then associate a source code change corresponding to record 706 (e.g., code change 214) with discontinuity 212.

In some embodiments, one or more modules 102 may access and/or utilize information included in record 706 to identify one or more properties associated with code change 214. For example, one or more of modules 102 (e.g., identifying module 106, associating module 108, etc.) may identify, without limitation: (1) a user associated with code change 214 based on an AuthorID field included in record 706, (2) a hash value associated with code change 214 based on a hash field included in record 706, (3) a date stamp associated with code change 214 based on a date stamp field included in record 706, and (4) a commit message associated with code change 214 based on a "Message" field included in record 706.

In at least one embodiment, associating module 108 may identify the particular change in the source code by using a code bisection algorithm. The use of such an algorithm may be particularly useful when an exemplary code base is complicated and/or includes a large number of commits over a relatively short period of time. For example, associating module 108 may identify an initial version of the program that produced an initial value (e.g., a value included in time series segment 402-1) and a subsequent version of the program that produced a subsequent value (e.g., a value included in time series segment 402-2). Associating module 108 may then execute a code bisection algorithm of the source code associated with the program, using the initial version as a known "good" version and the subsequent version as a known "bad" version. Associating module 108 may then select a version of the program that includes a code change that occurred at a time between the "good" version and the "bad" version, compile the selected version into a test build, and perform the software performance test corresponding to time series 210 using the test build. If the test build returns a performance value that is similar to (e.g., within a predetermined range of) the "bad" value, associating module 108 may designate the selected version as the "bad" version. Conversely, if the selected version returns a performance value that is similar to (e.g., within a predetermined range of) the initial value, associating module 108 may designate the selected version as the "good" version. Associating module 108 may then select a new version that includes a code change that occurred at a time between the "good" and "bad" versions, and repeat the code bisection process until it locates the code change that introduced the performance difference between the initial version and the subsequent version. At that point, associating module 108 may associate the located code change with discontinuity 212.

In some cases, a code change may cause discontinuities in more than one time series. In other words, a code change may cause variations in more than one performance metric associated with the program. For example, a code change may cause an increase in both build size of the program and memory footprint. To avoid duplication of identification and/or reporting of possible application performance incidents, associating module 108 may associate another identified discontinuity in an additional time series with a code change (e.g., code change 214) that is already associated with a discontinuity in a time series. For example, one or more modules 102 (e.g., receiving module 104, identifying module 106, etc.) may receive an additional time series 218 from storage server 206 and identify a discontinuity in the additional time series 218. Associating module 108 may then associate the identified discontinuity in additional time series 218 with code change 214. These operations may be performed in any of the ways described herein.

For example, associating module 108 may determine that code change 214 has a commit time that is also within a predetermined time preceding the time corresponding to the identified discontinuity in additional time series 218 and may associate the identified discontinuity in additional time series 218 with code change 214. This process may be repeated any number of times with any time series and/or identified discontinuities. Thus, as will be described in more detail below, the systems and methods described herein may execute a single automated action to address any number of application performance incidents caused by code change 214.

Returning to FIG. 3, at operation 308, one or more of the systems described herein may execute an automated action based on the association of the identified discontinuity with the change in the source code. For example, executing module 110 may, as part of tracking server 202 in FIG. 2, execute automated action 216 based on the association of discontinuity 212 with code change 214.

As used herein, an "automated action" may be any action that system 100 may execute based on the association of discontinuity 212 with code change 214. An automated action may include, without limitation, a message directing a user to identify, remediate, and/or track an application performance incident, a direction to one or more modules 102 to further associate code change 214 with one or more discontinuities within one or more additional time series 218, a further analytical and/or remedial action, and so forth.

Executing module 110 may execute automated action 216 based on the association of discontinuity 212 with code change 214 in a variety of contexts. For example, as described above, one or more of modules 102 (e.g., identifying module 106, associating module 108, etc.) may identify a user associated with code change 214 based on an AuthorID field included in record 706. Executing module 110 may then execute the automated action by generating a task request that directs the identified user to determine whether code change 214 introduced a regression into the program.

Executing module 110 may generate the task request in any suitable way. For example, executing module 110 may generate a task request that may be uploaded to and/or incorporated within any suitable computer-based task management system. By way of example, executing module 110 may generate a task request that may be incorporated within MICROSOFT OUTLOOK, GOOGLE TASKS, PHABRICATOR, SLACK, and/or any suitable custom task management solution.

An exemplary task request may include any suitable information that may aid the user in determining whether code change 214 introduced a regression into the program. Such information may include, but is not limited to, a unique identifier corresponding to code change 214 (e.g., a hash value included in record 706), a date and/or time corresponding to code change 214 (e.g., a date stamp included in record 706), a developer commit message corresponding to code change 214 (e.g., a message included in record 706), a user identifier of a developer who introduced code change 214 (e.g., an AuthorID included in record 706), a possible regression (e.g., application performance incident) that may have been identified by system 100, a request message that requests the developer to determine whether code change 214 is responsible for the possible egression, and so forth.

FIG. 8 illustrates an exemplary task request 800 that executing module 110 may generate to direct an identified user to determine whether code change 214 introduced a regression into the program. Task request 800 includes a JavaScript Object Notation (JSON) object 802 with a name of task and a value of another JSON object that includes three name-value pairs 804 (i.e., name-value pairs 804-1 through 804-3). Name-value pair 804-1 may include a name "Author_ID" and a value "dadams@example.com." Name-value pair 804-1 may indicate an identifier (e.g., an e-mail address) corresponding to a user who introduced code change 214 into the source code associated with the program. In some examples, executing module 110 may obtain the value of name-value pair 804-1 from an Author_ID field included in record 706.

Name-value pair 804-2 may include a name "subject" and a value "Please review a recent commit for a possible regression." Name-value pair 804-2 may represent a subject line for a task request message that executing module 110 may send to the user included in name-value pair 804-1. Name-value pair 804-3 may include a name "description" and a value that includes the body of the task request message that directs the user indicated in name-value pair 804-1 to determine whether code change 214 introduced a regression into the program. Additionally, name-value pair 804-3 may include any suitable information that the user indicated in name-value pair 804-1 may use to identify code change 214 within source code data 116 including, but not limited to, a commit hash value corresponding to code change 214, a date and/or time corresponding to code change 214, etc.

In some embodiments, one or more of the systems described herein may receive user input indicating a user determination of whether a change in source code introduced a regression into the program. For example, receiving module 104 may, as part of tracking server 202 in FIG. 2, receive user input from a user via user device 208 indicating a user determination of whether code change 214 introduced a regression into the program.

Once a user is notified that a code change they are associated with (e.g., they are the author of, they have been assigned to review, etc.) may introduce a regression into the program, the user may evaluate the code change to determine whether the code change actually introduced a regression into the program, or whether the application performance incident indicated by the identified discontinuity was actually the result of some other cause (e.g., high service usage at the time of the discontinuity, intentional source code changes, etc.). The user may then provide input (e.g., via user device 208) indicating the user's determination. One or more modules 102 (e.g., receiving module 104, executing module 110, user interface module 112, etc.) may then store data representative of the user's determination as part of automated action data 118 and/or previous user determination 220 in database 140.

In some embodiments, the user's determination of whether the code change actually introduced a regression into the program may be utilized in later operations by the systems described herein in order to iteratively improve the identification of discontinuities, and thus, application performance incidents. To that end, one or more of the systems described herein may receive data representative of a previous user determination of whether a previously identified discontinuity in a previous time indicated that a previous change in the source code introduced a previous regression into the program. For example, receiving module 104 may, as part of tracking server 202 in FIG. 2, receive previous user determination 220 from storage server 206. Then, one or more of the systems described herein may utilize previous user determination 220 to identify a discontinuity in a time series. For example, identifying module 106 may base an identification of a discontinuity on previous user determination 220.

Identifying module 106 may base an identification of a discontinuity on previous user determination 220 in any suitable way. For example, identifying module 106 may utilize previous user determination 220 (e.g., a determination whether a code change associated with an identified discontinuity in a time series introduced a regression into a program) as labeled training data for a suitable machine learning model (e.g., a supervised learning model, a semi-supervised learning model, etc.) implemented by a suitable machine learning platform. Suitable machine learning platforms may include, but are not limited to, FBLEARNER FLOW, GOOGLE CLOUD MACHINE LEARNING ENGINE, MICROSOFT AZURE MACHINE LEARNING, ADOBE SENSEI, AMAZON MACHINE LEARNING, etc. Identifying module 106 may then further base an identification of a discontinuity in a time series on an evaluation of the time series against the machine learning module that includes previous user determination 220.

The systems and methods described herein may utilize any of the user-inputted data described herein in a similar way. For example, identifying module 106 may identify a discontinuity in a time series based on an evaluation of the time series against a machine learning model that includes, as labeled training data, one or more temporal locations selected by a user as a discontinuity in a previous time series, as described above in relation to FIG. 6. In this and other ways, the systems and methods described herein may utilize user inputs to continuously improve identification and tracking of application performance incidents.

As discussed throughout the instant disclosure, the disclosed systems and methods may provide one or more advantages over traditional regression testing systems and methods. For example, identifying discontinuities in time series of performance metrics associated with a program may uncover even very small application performance incidents (i.e., very small variations in performance metrics associated with the program). Additionally, associating identified discontinuities with specific source code changes may serve to identify source code changes that may have caused specific application performance incidents. Additionally, an association between a discontinuity in performance data and a source code change may also serve to identify a specific developer who may have been responsible for introducing the change, and who may therefore be well-suited to determine whether the application performance incident resulted from an error or regression included in the source code change. Furthermore, the systems and methods described herein may provide a useful feedback mechanism that may lead to continuous improvement in the systems' ability to reliably identify and track application performance incidents.

As detailed above, the computing devices and systems described and/or illustrated herein broadly represent any type or form of computing device or system capable of executing computer-readable instructions, such as those contained within the modules described herein. In their most basic configuration, these computing device(s) may each include at least one memory device and at least one physical processor.

Although illustrated as separate elements, the modules described and/or illustrated herein may represent portions of a single module or application. In addition, in certain embodiments one or more of these modules may represent one or more software applications or programs that, when executed by a computing device, may cause the computing device to perform one or more tasks. For example, one or more of the modules described and/or illustrated herein may represent modules stored and configured to run on one or more of the computing devices or systems described and/or illustrated herein. One or more of these modules may also represent all or portions of one or more special-purpose computers configured to perform one or more tasks.

In addition, one or more of the modules described herein may transform data, physical devices, and/or representations of physical devices from one form to another. For example, one or more of the modules recited herein may receive time series data to be transformed, transform (e.g., normalize and/or standardize) the time series data, output a result of the transformation, use the result of the transformation to identify a discontinuity in the time series data, and store the result of the transformation to identify future discontinuities in other time series data. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

The process parameters and sequence of the steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method comprising:
   receiving, by an incident tracking system, data representative of a time series, the time series comprising a time-ordered plurality of values of a performance metric associated with a program, the performance metric comprising a quantifiable measurement of performance of the program, wherein modifications to source code of the program are tracked over time within a version-controlled source code base and stored in records of a change log;
   identifying, by the incident tracking system, a discontinuity in the time series, the discontinuity indicating a time of a change, greater than a predetermined threshold amount, of the performance metric;
   associating, by the incident tracking system, the identified discontinuity in the time series with a record in the change log of the source code base corresponding to a modification to the source code of the program by executing a code bisection algorithm against versions of the source code within the version-controlled source code base with commit times within a predetermined time threshold surrounding the discontinuity, the associating being based on the time of the change of the performance metric indicated by the identified discontinuity and a time associated with the record; and
   executing, by the incident tracking system, an automated action based on the association of the identified discontinuity with the record in the source code base.

2. The method of claim 1, further comprising normalizing, by the incident tracking system, the received data representative of the time series prior to identifying the discontinuity in the time series.

3. The method of claim 1, wherein:
   the time series further comprises:
     an initial set of values in the time-ordered plurality of values; and
     a subsequent set of values in the time-ordered plurality of values that immediately temporally follows the initial set of values; and
   identifying the discontinuity in the time series comprises:
     determining an initial value representative of the initial set of values and a subsequent value representative of the subsequent set of values;
     comparing the initial value with the subsequent value; and
     determining that the initial value is different from the subsequent value by at least the predetermined threshold amount based on the comparison of the initial value with the subsequent value.

4. The method of claim 3, wherein:
determining the initial value comprises determining an average of the initial set of values; and
determining the subsequent value comprises determining an average of the subsequent set of values.

5. The method of claim 3, wherein:
determining the initial value comprises determining a linear approximation of the initial set of values; and
determining the subsequent value comprises determining a linear approximation of the subsequent set of values.

6. The method of claim 3, wherein associating the identified discontinuity with the record in the source code base corresponding to the modification to the source code of the program by executing the code bisection algorithm against versions of the source code within the source code base with commit times within a predetermined time threshold surrounding the discontinuity comprises:
identifying a particular record in the source code base having a commit time that is within a predetermined time period preceding the time of the change of the performance metric indicated by the identified discontinuity; and
associating the identified discontinuity with the identified particular record in the source code base.

7. The method of claim 1, further comprising:
receiving, by the incident tracking system, data representative of an additional time series, the additional time series comprising another time-ordered plurality of values of another performance metric associated with a program;
identifying, by the incident tracking system, a discontinuity in the additional time series; and
further associating, by the incident tracking system, the identified discontinuity in the additional time series with the change in the source code.

8. The method of claim 1, further comprising identifying, by the incident tracking system, a user associated with the change in the source code;
wherein executing the automated action based on the association of the identified discontinuity with the change in the source code comprises generating a task request that directs the identified user to determine whether the change in the source code introduced a regression into the program.

9. The method of claim 8, further comprising receiving, by the incident tracking system, user input indicating a user determination of whether the change in the source code introduced the regression into the program.

10. The method of claim 1, further comprising presenting, by the incident tracking system, a graphical user interface comprising a visual representation of the time series to a user;
wherein identifying the discontinuity in the time series comprises receiving input from the user indicating a temporal location of the discontinuity in the time series.

11. The method of claim 1, further comprising receiving, by the incident tracking system, data representative of a previous user determination of whether a previously identified discontinuity in a previous time series indicated that a previous modification to the source code introduced a previous regression into the program;
wherein the identification of the discontinuity is further based on the received data representative of the previous user determination.

12. The computer-implemented method of claim 1, wherein executing the code bisection algorithm against versions of the source code within the source code base with commit times within a predetermined time threshold surrounding the discontinuity comprises:
identifying, within the version-controlled source code base:
an initial version of the program having a commit time prior to the discontinuity and that produced an initial performance metric value; and
a subsequent version of the program having a commit time subsequent to the discontinuity and that produced a subsequent performance metric value;
when there is at least one intermediate version of the program having a commit time between the commit time of the initial version and the commit time of the subsequent version:
selecting an intermediate version of the program that includes a code change that occurred at an intermediate time between the commit time of the initial version and the commit time of the subsequent version;
determining a test performance metric associated with the intermediate version of the program by executing a software performance test using a test build based on the intermediate version of the program;
when the test performance metric is within a predetermined range of the initial value of the performance metric, designating the intermediate version of the program as the initial version of the program; and
when the test performance metric is within a predetermined range of the subsequent value of the performance metric, designating the intermediate version of the program as the subsequent version; and
when the commit time of the subsequent version immediately follows the commit time of the initial version within the version-controlled source code base, associating a record in the version-controlled source code base corresponding with the subsequent version with the identified discontinuity.

13. A system comprising:
a receiving module, stored in memory, that receives data representative of a time series, the time series comprising a time-ordered plurality of values of a performance metric associated with a program, the performance metric comprising a quantifiable measurement of performance of the program, wherein modifications to source code of the program are tracked over time within a version-controlled source code base and stored in records of a change log;
an identifying module, stored in memory, that identifies a discontinuity in the time series, the discontinuity corresponding a time of a change, greater than a predetermined threshold amount, of the performance metric;
an associating module, stored in memory, that associates the identified discontinuity in the time series with a record in the change log of the source code base corresponding to a modification to the source code of the program by executing a code bisection algorithm against versions of the source code within the source code base with commit times within a predetermined time threshold surrounding the discontinuity, the associating being based on the time of the change of the performance metric indicated by the identified discontinuity and a time associated with the record;

an executing module, stored in memory, that executes an automated action based on the association of the identified discontinuity with the record in the source code base; and at least one physical processor that executes the receiving module, the identifying module, the associating module, and the executing module.

14. The system of claim 13, wherein:
the time series further comprises:
an initial set of values in the time-ordered plurality of values; and
a subsequent set of values in the time-ordered plurality of values that immediately temporally follows the initial set of values; and
the identifying module identifies the discontinuity in the time series by:
determining an initial value representative of the initial set of values and a subsequent value representative of the subsequent set of values;
comparing the initial value with the subsequent value; and
determining that the initial value is different from the subsequent value by at least the predetermined threshold amount based on the comparison of the initial value with the subsequent value.

15. The system of claim 14, wherein the associating module associates the identified discontinuity with the record in the source code base corresponding to the change in the source code by:
identifying a particular record in the source code base having a commit time that is within a predetermined time period preceding the time of the change of the performance metric indicated by the identified discontinuity; and
associating the identified discontinuity with the particular record in the source code base.

16. The system of claim 13, wherein:
the associating module further identifies a user associated with the change in the source code; and
the executing module executes the automated action based on the association of the identified discontinuity with the change in the source code by generating a task request that directs the identified user to determine whether the change in the source code introduced a regression into the program.

17. The system of claim 16 further comprising a user interface module that receives user input indicating a user determination of whether the change in the source code introduced the regression into the program;
wherein the at least one physical processor further executes the user interface module.

18. The system of claim 17, wherein the receiving module further receives data representative of a previous user determination of whether a previously identified discontinuity in a previous time series indicated that a previous change in the source code introduced a previous regression into the program; and
the identifying module identifies the discontinuity further based on the received data representative of the previous user determination.

19. The system of claim 13, wherein the associating module executes the code bisection algorithm against versions of the source code within the source code base with commit times within a predetermined time threshold surrounding the discontinuity by:

identifying, within the version-controlled source code base:
an initial version of the program having a commit time prior to the discontinuity and that produced an initial performance metric value; and
a subsequent version of the program having a commit time subsequent to the discontinuity and that produced a subsequent performance metric value;
when there is at least one intermediate version of the program having a commit time between the commit time of the initial version and the commit time of the subsequent version:
selecting an intermediate version of the program that includes a code change that occurred at an intermediate time between the commit time of the initial version and the commit time of the subsequent version;
determining a test performance metric associated with the intermediate version of the program by executing a software performance test using a test build based on the intermediate version of the program;
when the test performance metric is within a predetermined range of the initial value of the performance metric, designating the intermediate version of the program as the initial version of the program; and
when the test performance metric is within a predetermined range of the subsequent value of the performance metric, designating the intermediate version of the program as the subsequent version; and
when the commit time of the subsequent version immediately follows the commit time of the initial version within the version-controlled source code base, associating a record in the version-controlled source code base corresponding with the subsequent version with the identified discontinuity.

20. A non-transitory computer-readable medium comprising instructions that, when executed by at least one processor of a computing system, cause the computing system to:
receive data representative of a time series, the time series comprising a time-ordered plurality of values of a performance metric associated with a program, the performance metric comprising a quantifiable measurement of performance of the program, wherein modifications to source code of the program are tracked over time within a version-controlled source code base and stored in records of a change log;
identify a discontinuity in the time series, the discontinuity indicating a time of a change, greater than a predetermined threshold amount, of the performance metric;
associate the identified discontinuity in the time series with a record in the change log of the source code base corresponding to a modification to the source code of the program by executing a code bisection algorithm against versions of the source code within the source code base with commit times within a predetermined time threshold surrounding the discontinuity, the associating being based on the time of the change of the performance metric indicated by the identified discontinuity and a time associated with the record; and
execute an automated action based on the association of the identified discontinuity with the record in the source code base.

* * * * *